United States Patent [19]

Distelrath et al.

[11] Patent Number: 5,138,988
[45] Date of Patent: * Aug. 18, 1992

[54] INTAKE DUCT

[75] Inventors: Winfried Distelrath, Stuttgart; Roland-Dieter Zebli, Wurmberg, both of Fed. Rep. of Germany

[73] Assignee: Dr. Ing. h.c.F. Porsche AG, Fed. Rep. of Germany

[*] Notice: The portion of the term of this patent subsequent to Sep. 24, 2008 has been disclaimed.

[21] Appl. No.: 620,024

[22] Filed: Nov. 30, 1990

[30] Foreign Application Priority Data

Dec. 11, 1989 [DE] Fed. Rep. of Germany ....... 3940838

[51] Int. Cl.$^5$ .................... F02B 27/00; F02B 29/02
[52] U.S. Cl. ................. 123/188.14; 123/52 M; 123/308; 123/432
[58] Field of Search ............ 123/188 M, 308, 432, 123/302, 52 M

[56] References Cited

U.S. PATENT DOCUMENTS

| | | | |
|---|---|---|---|
| 2,958,313 | 11/1960 | Kincaid | 123/301 |
| 3,270,733 | 9/1966 | Steidler | 123/188 M |
| 4,174,686 | 11/1979 | Shimizu et al. | 123/188 M |
| 4,359,997 | 11/1982 | Lyssy | 123/188 M |
| 4,550,699 | 11/1985 | Okumura et al. | 123/188 M |
| 4,702,207 | 10/1987 | Hatumura et al. | 123/302 |
| 5,050,566 | 9/1991 | Distelrath et al. | 123/188 M |

FOREIGN PATENT DOCUMENTS

| | | |
|---|---|---|
| 2922058 | 1/1984 | Fed. Rep. of Germany . |
| 3508763 | 1/1986 | Fed. Rep. of Germany . |
| 3924543 | 6/1990 | Fed. Rep. of Germany . |
| 2056553 | 3/1981 | United Kingdom . |
| 2172658 | 9/1986 | United Kingdom . |

OTHER PUBLICATIONS

Information of the Institute for Combustion Engines and Thermodynamics, vol. 31b, Illustrated Part, 1982, two pages Suzuke GSX 250 E.
DE-FZ, MTZ, 45 (1984) 10, pp. 415, 416, 417, Illustration 2.

Primary Examiner—E. Rollins Cross
Assistant Examiner—Erick Solis
Attorney, Agent, or Firm—Evenson, Wands, Edwards, Lenahan & McKeown

[57] ABSTRACT

An intake duct in a cylinder head of an internal-combustion engine has a defined flow profile by which the flow rate of the gas flow is accelerated continuously, specifically up to a first intake duct segment of the intake duct which, as viewed in the flow direction, is situated in front of the valve stem. Subsequently, in a second intake duct segment, the flow rate of the gas flow is reduced continuously, whereby a lower approach flow rate of the valve is achieved. This results in an optimized volumetric efficiency which has a favorable influence on the performance and consumption of the internal-combustion engine.

18 Claims, 2 Drawing Sheets

5,138,988

INTAKE DUCT

BACKGROUND AND SUMMARY OF THE INVENTION

The present invention relates to an intake duct and process for influencing the flow rate in the duct. More particularly, it relates to an intake duct of an internal-combustion (IC) engine in which a gas flow is controlled by a valve and the duct has a defined flow profile by which the flow rate of the gas flow is continuously accelerated.

In a known flow duct such as shown in German Pat. No. DE-OS 35 08 763, the flow profile is configured such that it tapers continuously toward the valve seat insert. This configuration is based on the physical principle that, when the flow is unimpaired, the lowest losses occur in the flow duct if the cross-section of the flow duct narrows down continuously or the flow rate of the gas flow is increased continuously. In the case of a flow duct having a valve, however, an unimpaired flow cannot be realized inasmuch as the valve causes a considerable flow resistance. This resistance, in connection with a flow profile of this type, prevents optimized operation of the internal-combustion engine.

In addition, a known inlet duct shown in German Pat. No. DE-PS 28 22 058 which has a duct segment disposed downstream in front of the valve and configured to be circular, tapered, and leading into a cup constructed as a swirl inlet chamber. The cup is arranged asymmetrically with respect to the duct segment, and a sleeve is inserted into the segment adjacent to the valve. This construction has, on the one hand, the disadvantage that the sleeve will cause losses as a result of an impact in the flow direction. On the other hand, the boundary of the sleeve which is adjacent to the valve forms a breakaway edge which also causes flow losses. Additional flow losses occur in this construction as a result of the formation of turbulence in the cup.

It is an object of the present invention, therefore, to construct an intake duct in a cylinder head of an internal-combustion engine such that the flow rate of the gas flow takes into account the resistance caused by the inlet valve for achieving better operating characteristics of the internal-combustion engine, for example, as a result of an optimized volumetric efficiency.

This object is achieved in accordance with the present invention by configuring the intake duct downstream in the flow direction with a defined flow profile which, in a first intake duct segment, has a uniform cross-sectional contraction up to a cross-sectional transition area situated relatively closely in front of the valve stem and after that, in a second intake duct segment, has a widening uniform cross-section.

The principal advantages achieved with the present invention are that the gas flow in the intake duct segments of the cylinder head has an optimized flow rate course which accelerates the gas flow up to the cross-sectional transition area and then decelerates it. The deceleration causes a reduction of the flow resistance which improves the volumetric efficiency of the internal-combustion engine. This, in turn, has a performance-increasing and consumption-reducing effect.

BRIEF DESCRIPTION OF THE DRAWINGS

These and further objects, features and advantages of the present invention will become more apparent from the following detailed description of several presently preferred embodiments which taken in conjunction with the accompanying drawings wherein.

DETAILED DESCRIPTION OF THE DRAWINGS

Figure 1:
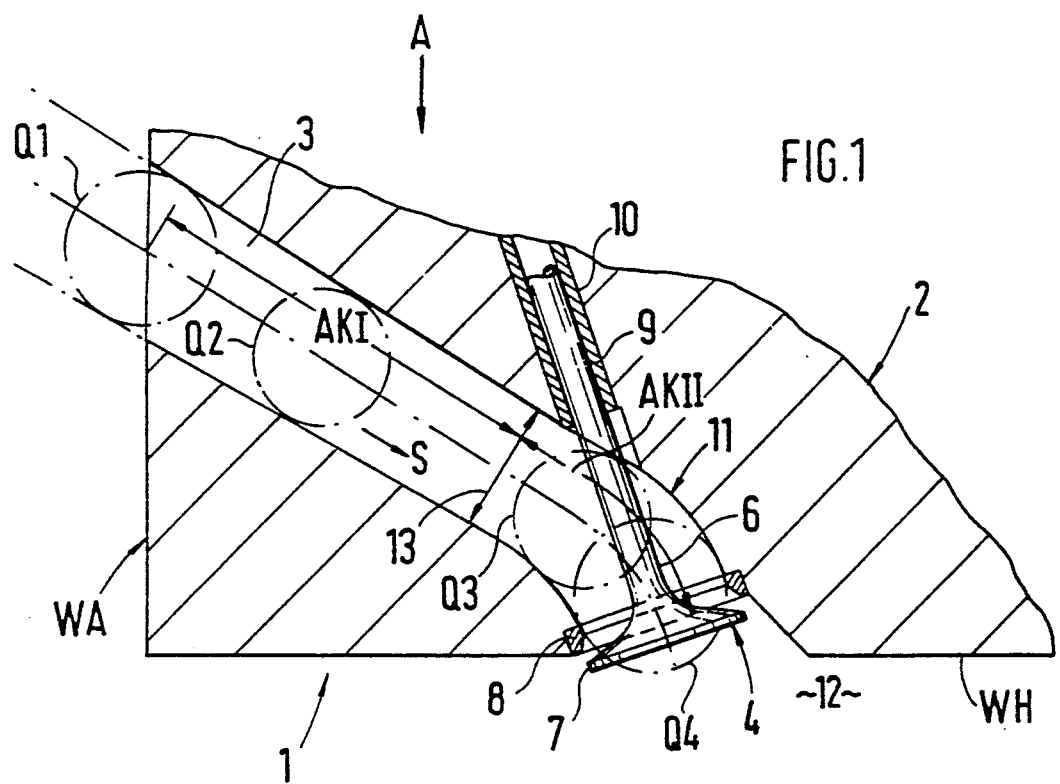
FIG. 1 is a partial cross-sectional view of an internal-combustion engine in the area of an intake system and of a cylinder head.

In the illustrated area of FIG. 1, the internal-combustion engine 1 comprises a cylinder head 2 having an intake duct 3 which extends partially in a curved manner between a first vertical boundary wall WA and a second but horizontal boundary wall WH.

A valve 4 actuated by a camshaft (not shown) is provided at the end of the intake duct 3 and has a valve stem 6 and a valve disk 7. The valve disk 7 cooperates with a valve seat 8. The valve stem 6 is axially movably arranged in a valve stem guide 9 which, in turn, rests in a bore 10 in the cylinder head 2. The valve stem 6 is locally, specifically in the area of a curvature 11 of the intake duct 3, subjected to a gas flow which is controlled by the valve 4. When the valve 4 is open, the gas flow enters into a combustion chamber 12.

The intake duct 3 with the circular cross-section shown by the dot-dash lines has the following flow profile: in a first intake duct segment AK I of the intake duct 3, the duct cross-section tapers uniformly conically in the direction, i.e., in the flow direction S to a cross-sectional transition area 13 which, as also viewed in the flow direction S, is disposed relatively closely in front of the valve stem 6. The cross-section, in turn, widens uniformly and conically behind the cross-sectional transition area in a second intake duct section AK II. The cross-sectional tapering is defined by $Q1 > Q2$, and the cross-section widening is defined by $Q3 < Q4$. The cross-section widening is defined by $Q1 > Q2$ depending on the type and size of the internal-combustion engine, is between 18 and 24%.

Figure 3:
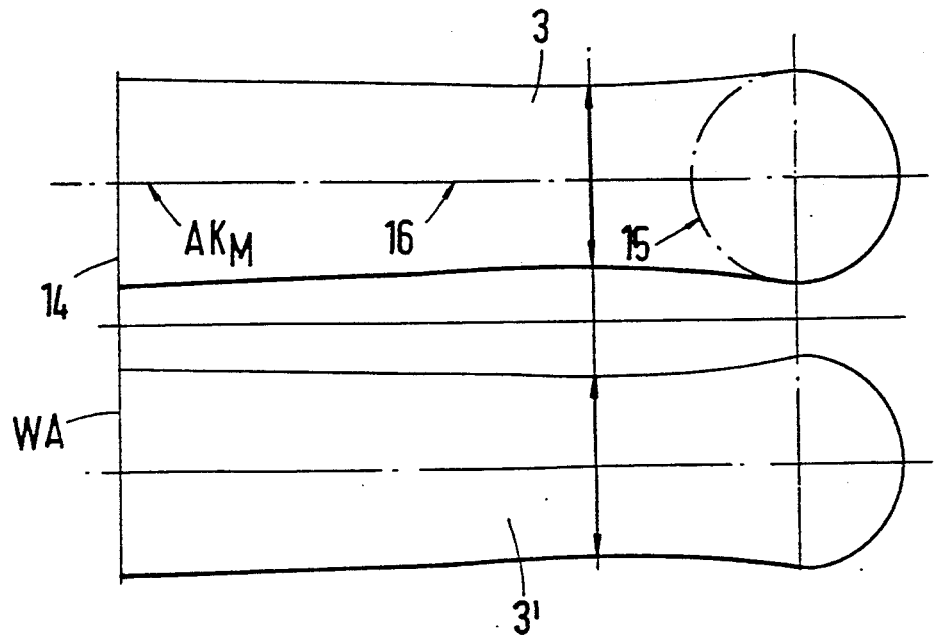
FIG. 3 is a schematic view in the direction of arrow A of FIG. 1.

In addition, the intake duct 3 comprises an inlet opening 14 and an outlet opening 15 shown in FIG. 3. The centers Z 1 and Z 2 of the inlet opening 14 and of the outlet opening 15, as seen in a top view of the cylinder head 2 (FIG. 3), are disposed on a straight line 16 which encloses a longitudinal center plane $AK_m$ of the intake duct 3.

For improving the flow action of the gas flow, the surface of the intake duct 3 has a smooth finish. To obtain this finish, an NC (numerical control) machine is used, for example, in which case the first intake duct segment AK I between the inlet opening 14 and the cross-sectional transition area 12 is machined from a first boundary wall WA; the second intake duct section AK II is machined from the second boundary wall WH.

Figure 2:
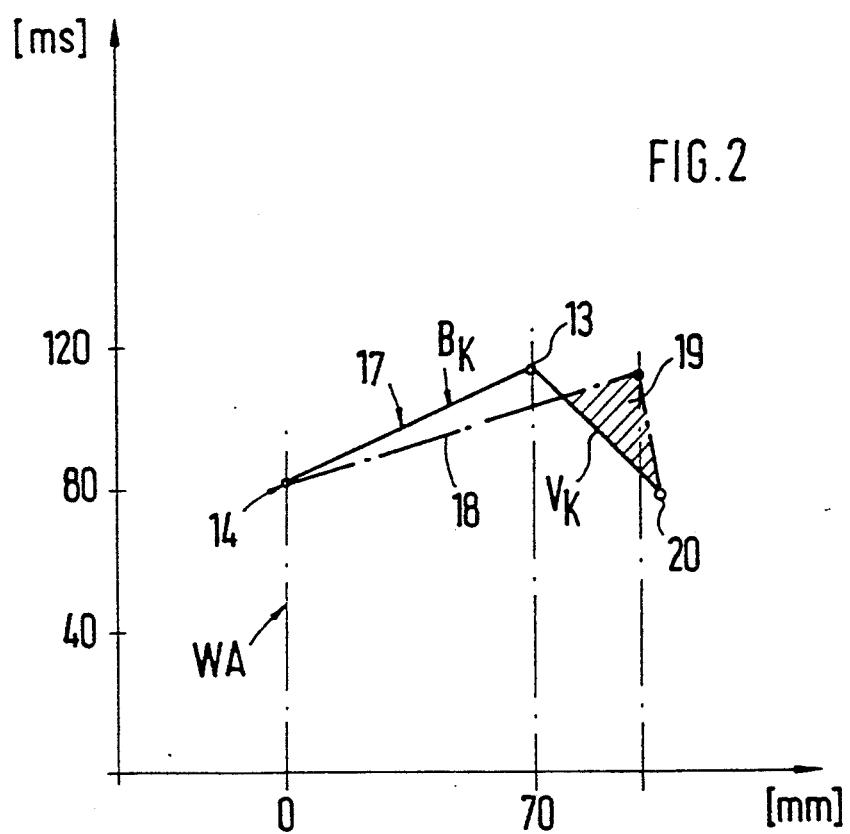
FIG. 2 is a diagram illustrating the course of the flow rate of a gas flow in an intake system.

FIG. 2 illustrates the course of the flow rate of the gas flow in the intake duct 3. In this case, the rate is entered on the ordinate in m/s, and the length of the intake duct is indicated on the abscissa in mm. The solid line 17 reflects the continuous acceleration $B_K$ to the cross-sectional transition area 13, and after that, the continuous deceleration $V_K$ of the gas flow. The dash-dotted line 18 indicates the course of the flow rate of the gas flow according to conventional arrangements. This comparison demonstrates that the gas flow according to line 18 is accelerated closely in front of the narrowest cross-section in the area of the valve seat insert. The hatched triangle 19 represents the reduction of the flow resistance. At point 20, the gas flow flows at a valve splitting rate. Depending on the concept of the internal-combustion engine, the flow profile, with respect to its position, is defined along the ordinate. The length of the intake duct 3 (between 60 and 120 mm) depends on the geometry of the cylinder head 2.

FIG. 3 illustrates two intake ducts 3, 3' extending parallel to one another. Both intake ducts 3, 3' are constructed essentially separate from one another along their entire length and of conical shape. In addition, they have flow profiles which are identical in principle. This configuration is suitable for an internal-combustion engine having at least two valves for each cylinder which are arranged in the cylinder head and are actuated, for example, by two camshafts.

Figure 4:
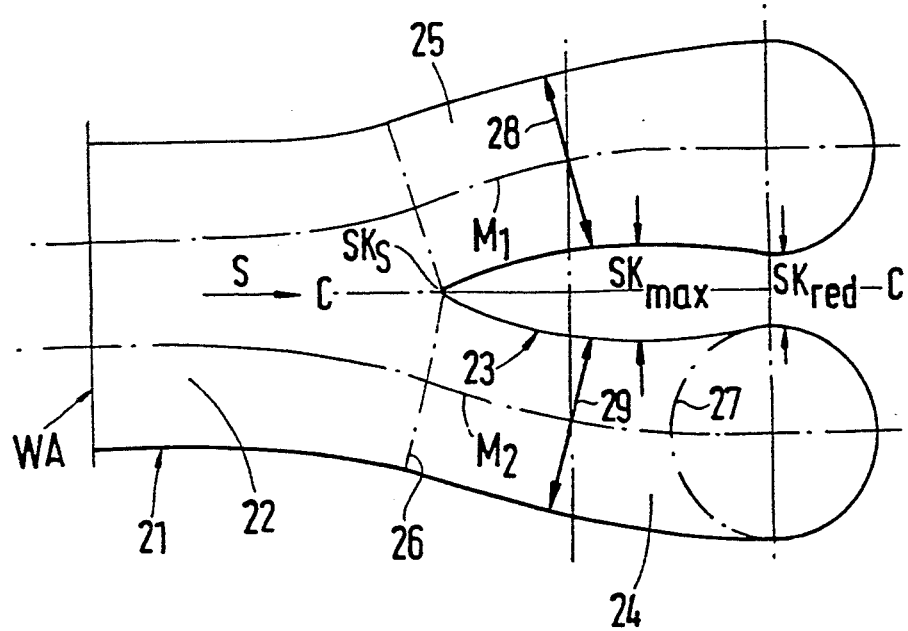
FIG. 4 is a view corresponding in orientation to FIG. 3, but of another embodiment in accordance with the present invention.

FIG. 4 also shows an intake duct 21 for an internal-combustion engine having two inlet valves for each cylinder. The intake duct 21 has a flow profile similar to that illustrated in FIG. 2. However, viewed in the flow direction S, the embodiment of FIG. 4 first is a single duct 22 which is then divided into two separate duct areas 24, 25 by a partition 23. These duct areas are bifurcated and lead to the inlet valves. The partition 23, as viewed in the flow direction S, starts downstream in front of the valve stem 10 and is constructed in the manner of a flow body with a symmetrically streamlined profile. The partition 23 starts with a point $SK_S$ in the opposite direction of the gas flow and, by virtue of corresponding manufacturing processes, is constructed in a blade-like manner. The partition 23 widens continuously on both sides of a transverse center plan C-C to a maximal width $SK_{max}$, and from there the profile tapers to a reduced width $SK_{red}$. The flow body, specifically the relationships $SK_{max}$ and $SK_{red}$, may be defined empirically and/or mathematically taking into account constructive conditions and minimal friction losses and pressure losses.

The center lines $M_1$ and $M_2$ of the essentially circular duct areas 24, 25, viewed in the longitudinal direction of the intake duct 22 or the flow direction S, extend in a slightly curved manner (depending on the type of construction), i.e., moderately offset between the inlet openings 26 and the outlet openings 27.

Finally, cross-sectional transition areas 28, 29 are provided in the duct areas 24, 25 in this intake design. In the first intake duct area, gas flow is accelerated up to the cross-sectional transition areas 28, 29 which are situated downstream, viewed in flow direction S, relatively closely in front of the valve stem, and subsequently in the second intake duct area, the gas flow is decelerated by virtue of the uniform cross-sectional widening behind these cross-sectional transition areas.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a cylinder head of an internal-combustion engine, an intake duct is provided in which a gas flow is controlled by a valve comprising a valve disk cooperating with a valve seat and a valve stem connected with the valve disk which is axially movably disposed in a valve stem guide, the valve stem being arranged adjacent to the valve seat in the intake duct, wherein the intake duct is provided solely within the cylinder head, as viewed in a direction of gas flow, with a defined flow profile which, in a first intake duct segment up to a cross-sectional transition area situated relatively closely in front of the valve stem, has a uniform cross-sectional narrowing and thereafter, in a second intake duct segment immediately adjacent the first intake duct segment, has a uniform cross-sectional widening, and has a center line with no more than one moderate offset between an inlet opening and an outlet opening of the intake duct.

2. An intake duct according to claim 1, wherein the inlet opening and the outlet opening of the intake duct are circular and have respective centers disposed on a straight line which encloses the longitudinal center plane of the intake duct.

3. An intake duct according to claim 1, wherein the cross-sectional narrowing of the first intake duct segment is conical up to the cross-sectional transition area.

4. An intake duct according to claim 3, wherein the cross-sectional narrowing is between about 18 and 25%.

5. An intake duct according to claim 1, wherein the cylinder head comprises at least two inlet valves for each cylinder which control the gas flow in respective separate intake ducts, and the intake ducts have flow profiles which are identical in principle.

6. An intake duct according to claim 5, wherein the inlet opening and the outlet opening of the intake duct are circular and have respective centers disposed on a straight line which encloses the longitudinal center plane of the intake duct.

7. An intake duct according to claim 6, wherein the cross-sectional narrowing of the first intake duct segment is conical up to the cross-sectional transition area.

8. An intake duct according to claim 7, wherein the cross-sectional sectional narrowing is between about 18 and 25%.

9. An intake duct according to claim 1, wherein the cylinder head comprises at least two inlet valves for each cylinder which control the gas flow in the intake duct, the intake duct being provided downstream, as viewed in a direction of gas flow, first being an individual duct and thereafter being divided by a partition beginning in front of the valve stem into two separate duct areas, and the flow profile extends along the individual duct and the duct areas.

10. An intake duct according to claim 9, the inlet opening and the outlet opening of the intake duct are circular and have respective centers disposed on a straight line which encloses the longitudinal center plan of the intake duct.

11. An intake duct according to claim 10, wherein the cross-sectional narrowing of the first intake duct segment I) is conical up to the cross-sectional transition area.

12. An intake duct according to claim 11, wherein the cross-sectional narrowing is between about 18 and 25%.

13. An intake duct according to claim 9, wherein the partition is constructed between the duct areas as a flow body having a symmetrically streamlined profile.

14. An intake duct according to claim 9, wherein the flow body widens from a point opposite the gas flow by way of a first body section, from which the profile tapers to a reduced width.

15. An intake duct according to claim 9, wherein a point which is opposite to the gas flow has a blade-like configuration.

16. An intake duct according to claim 13, wherein a point which is opposite to the gas flow has a blade-like configuration.

17. An intake duct according to claim 1, wherein the duct has a smoothly machined surface, the first intake duct segment is machined from a first boundary wall and the second intake duct segment is machined from a second boundary wall.

18. A process for influencing flow rate of gas flow in an intake duct in a cylinder head of an internal combustion engine of the type in which a gas flow is controlled by a valve comprising a valve disk cooperating with a valve seat and a valve stem connected with the valve disk which is axially movably disposed in a valve stem guide, the valve stem being arranged adjacent to the valve seat in the intake duct, wherein the intake duct is provided solely within the cylinder head, as viewed in a direction of gas flow, with a defined flow profile which, in a first intake duct segment up to a cross-sectional transition area situated relatively closely in front of the valve stem, has a uniform cross-sectional narrowing and thereafter, in a second intake duct segment immediately adjacent the first intake duct segment, has a uniform cross-sectional widening, and has a center line with no more than one moderate offset between an inlet opening and an outlet opening of the intake duct; said process comprising the steps of:

increasing continuously the flow rate of the gas flow in a first intake duct segment up to cross-sectional transition area; and thereafter, decreasing continuously the flow rate in a second intake duct segment.

* * * * *